Aug. 11, 1953

M. C. TOURNIER

INTEGRAL ELECTRODE WITH LEAD WIRE ANCHOR FOR PIEZOELECTRIC CRYSTAL

Original Filed Feb. 18, 1947

2,648,785

INVENTOR.
MARCEL CHARLES TOURNIER

BY

Robert Harding Jr.
ATTORNEY

Patented Aug. 11, 1953 2,648,785

UNITED STATES PATENT OFFICE 2,648,785

INTEGRAL ELECTRODE WITH LEAD WIRE ANCHOR FOR PIEZOELECTRIC CRYSTAL

Marcel Charles Tournier, Paris, France, assignor to International Standard Electric Corporation, New York, N. Y., a corporation of Delaware Continuation of application Serial No. 729,347, February 18, 1947. This application November 12, 1949, Serial No. 126,780. In France August 2, 1939

Section 1, Public Law 690, August 8, 1946
Patent expires August 2, 1959

8 Claims. (Cl. 310—9.0)

This application is a continuation of and a substitute for U. S. application No. 729,347 filed February 18, 1947, now abandoned.

The present invention relates to piezo-electric elements and more particularly to a method of and means for supporting and making electrical connection to piezo-electric elements such as quartz crystals.

More particularly, the invention relates to the electric connection and to the mechanical support of quartz crystals whose surfaces called upon to play the part of electrodes are covered, by spraying for example, with thin layers of aluminium or other metal.

Such quartz crystals are usually supported and electrically connected in circuit by means of flexible metallic claws or spurs contacting at desired points on the metallised surface of the crystal. This means of support and connection is, however, subject to certain inconvenience, notably due to the fact that aluminium or other metal applied in a thin layer on the electrode surface of the crystal becomes damaged at the contacting points of the claws, which leads to a defective electrical contact. Moreover, the precision of positioning of such flexible contacts is often upset by mechanical shocks received by the crystal which is likely to change the position of the contacting points, which fact contributes to damaging the electrical contacts.

The invention provides means for supporting and for electrically connecting a piezo-electric element, such as a quartz crystal which avoids these drawbacks, as well as a method utilizing these means.

The method of constructing a piezo-electric element according to the invention is characterized in this, that metal contact pieces are fixed at suitable points, for example nodal points, of the desired harmonic frequency, to the electrode surfaces of a piezo-electric crystal plate by means of a suitable adhesive substance, an electric connecting wire or rod being secured to each of said contact pieces so as to ensure mechanical and electrical connection between the wire and crystal plate, and a thin layer of metal being applied by volatilisation or cathodic spraying or projection on to said exposed electrode surfaces and exposed surfaces of said contact pieces, the unit thus formed after the formation of the said layer or for the formation of the said layer as conditions dictate, being suitably mounted by means of said wires or rod in an evacuated vessel.

A piezo-electric crystal element constructed according to the invention comprises a plate of piezo-electric substance, metallic contact pieces secured to the plate at suitable points of the electrode surfaces by means of suitable adhesive substance wires or rods secured to said contact pieces to serve for making electrical connection to the electrodes of the crystal plate and for mechanically supporting said plate and a thin metallic layer covering the exposed surfaces of the contact pieces and the electrode surfaces of the crystal plate, the said plate being supported by means of said rods or wires in an evacuated vessel.

The formation of the electrode on the electrode surface of the crystal ensures an electrical uniformity of the electrode surface of the crystal. One or more crystals thus treated may be mounted inside an envelope which has been evacuated, with lead-out connections to the rods welded to the metal contact pieces and supporting the crystals or crystal.

The invention will be described in detail in the following description of embodiments thereof taken in conjunction with the accompanying drawings, in which.

In all the figures, the piezo-electric crystal plate is indicated by 1, the metallic contact pieces 2 are fixed in suitable places on the electrode surface of the crystal, for example, by means of a layer of an organic substance shown at 3 which melts at a temperature higher than the temperature at which the crystal will be subjected to when operating for example, about 150° C. An example of such a substance which ensures a particularly firm adhesion of the contact pieces 2 to the crystal 1 is the substance sold under the registered trade-mark "Mowilith." This is a vinyl resin adhesive made by Advance Solvents & Chem. Co. according to Chem. & Met 41, 589 (1934). This substance has the advantage of not emitting reducing organic vapors in the vacuum and consequently of coating the surfaces of the crystal on which are fixed the said metal contact pieces 2 which make good connection between the electrode surfaces and the surfaces of the contact pieces. For quartz crystals subjected to higher temperatures, an example of suitable fixing substance is a cement composed of the synthetic resin which is the product of the condensation of cresol or phenol with formaldehyde (such as that sold under the registered trade-mark "Bakelite"), and plaster. Heat is applied to polymerise the mixture. The Bakelite in polymerising, exudes water which is absorbed by the plaster and thus the disadvantage of exudations of drops of vapor which would render the Bakelite very fragile, is eliminated. The interspersed plaster particles, easily seen through a microscope, give the material added strength and lasting properties.

An example of a mixture of plaster and Bakelite which is particularly interesting for this purpose, is a mixture containing approximately 30% of plaster and 70% Bakelite.

Figure 1:
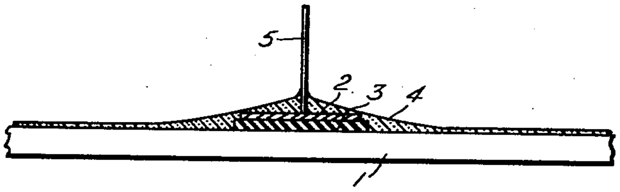
Fig. 1 shows diagrammatically a piezo-electric quartz crystal with a connection effected in accordance with the invention.

After fixing the contact pieces 2, which may consist of tinned copper or nickel, and which may have any desirable shape, round, square, or rectangular or any more complex shape, on the surface of the crystal at chosen nodal points, the operation of coating the electrode surfaces, including the exposed surfaces of the contact pieces 2, is carried out in vacuo in any known manner, for example, by cathodic spraying with a metal such as gold or by volatilisation or projection of a metal such as aluminium. This coating is indicated at 4 on Fig. 1. The connecting wires 5 are welded on each contact piece 2 before fixing these latter and, these connecting wires serve at the same time as mechanical supports of the crystal element.

Such a way of connecting and supporting a quartz crystal is capable of embodiment in numerous practical devices, thereby simplifying the mounting and the support of the piezo-electric crystals in various devices.

For example, in the case where the metal electrodes of a crystal are divided, for example, so as to cause the crystal to vibrate at a harmonic frequency, it is clear that the mounting of a quartz crystal is simplified compared with the method of mounting by gripping. In the case of a quartz crystal which has to vibrate on a harmonic which is relatively high for example, on the fifth harmonic as indicated in Fig. 2, a mechanical supporting arrangement by gripping at the nodal points would obviously be rather complex.

Figure 2:
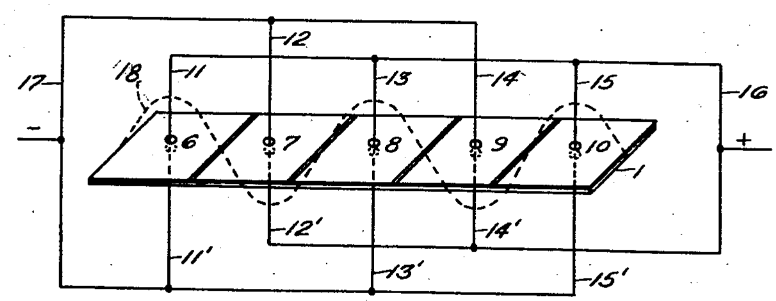
Fig. 2 shows an example of an embodiment of the invention in a quartz crystal arranged to vibrate at relatively high harmonic of the natural frequency of the crystal, the fifth in the example shown.

As shown in Fig. 2, the method of connection and support according to the present invention on the other hand, is simple. In the case of the crystal shown, each electrode surface is divided into five parts 6, 7, 8, 9, and 10, and connections are effected as described with reference to Fig. 1 for each of these parts of metal coating or more exactly the connecting rods 11 to 15 and $11^1$ to $15^1$ are first of all applied on the quartz crystals at the predetermined nodal points when the quartz crystal 1 is required to vibrate on its fifth harmonic and a metallic coating is applied and then divided. The connections 11, $12^1$, 13, $14^1$ and 15 are then electrically connected as indicated by 16 while the connections $11^1$, 12, $13^1$, 14 and $15^1$ are on the other hand, similarly connected as indicated at 17 which connection may be effected in a very simple way, according to the distribution of the peaks of an elastic wave of the fifth harmonic indicated in dotted lines at 18. These connections 16 and 17 may, for example, consist simply of conducting wires or rods, preferably of the same metal as the connecting wires connected to the quartz crystals, and to which wires they are welded or brazed.

Figure 3:
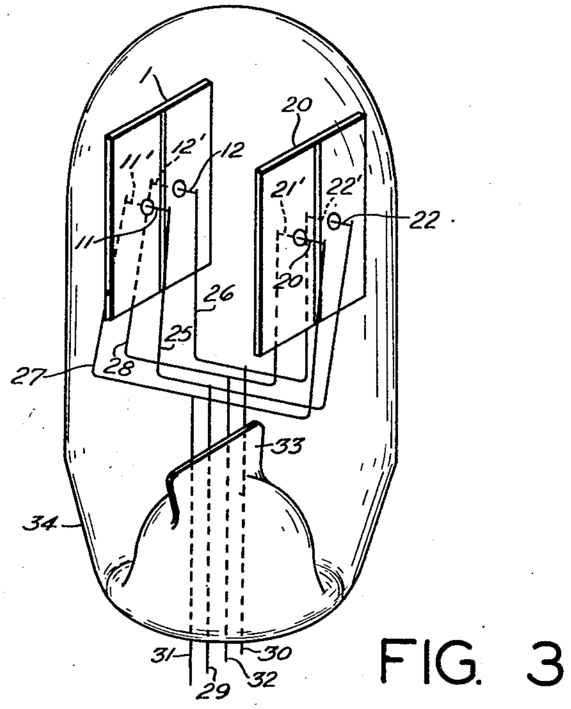
Fig. 3 shows an example of an embodiment of the invention in a pair of quartz crystals with divided electrodes and capable of being used, for example, in bridge filter structures.

Another application of the invention which facilitates the support and connection of quartz crystals of the divided electrode type lies in quartz crystals utilised in bridge filtering circuits. Fig. 3 shows an example of such an arrangement which would obviously be rather complex with connecting arrangements utilising gripping means. At the nodal points of the divided surfaces of the two crystal plates 1 and 20, are provided electrical supporting connections such as those shown in greater detail on Fig. 1. In the arrangement shown, a rigid bent rod 25 is joined to the connecting wires 11 and 22, a rigid bent rod 26 is joined to the connecting wires 12 and $22^1$, a rigid bent rod 27 is joined to the connecting wires $11^1$ and 21 and rigid bent rod 28 is joined to the connecting wires $12^1$ and $21^1$. The four bent rigid rods 25 and 28 are supported by rigid straight rods 29 to 32 respectively, which pass through a pressed foot 33 composed of insulation material of a bulb or envelope of glass or other insulating or conductive material and which contains an electromechanic vibrating system. This bulb 34 may be evacuated or be filled with a gas such as hydrogen at low pressure, which ensures a practically unlimited life to the unit which is thus not affected in practice by external atmospheric conditions.

In a general way, moreover, all crystals incorporating characteristics of the invention, simple, divided or assembled in groups, may, in a simple manner, be enclosed inside protective envelopes of this kind in the usual manner employed in the case of electronic discharge valve envelopes or these envelopes may be gas filled so as to ensure their protection against harmful external mechanical or atmospheric effects.

It is moreover, clear that the two embodiments described above have only been given by way of example to show clearly the advantages of the present invention, but that other quartz crystals or other piezo-electric substance, the electrical connections and supports of which are effected in accordance with the invention, may be employed in all the normal applications of such vibrating electromechanical elements.

It is also clear that the invention is capable of numerous modifications, for instance in the choice of adhesive substances, the manner of application of the contact pieces, the connecting wires and the metal, as well as in the choice of the shape of the contact pieces and the dimensions thereof with relation to the shape of the total surface or surfaces of the electrode surfaces, without departing from the scope of the invention.

What is claimed is:

1. A piezo electric element comprising a plate of piezo-electric substance, a metal contact piece secured to said plate, a wire secured to said contact piece for making electrical and mechanical connection to said plate, and a metallic layer covering the exposed surfaces of the contact piece and the adjacent surface of the piezo-electric plate.

2. A piezo-electric element comprising a plate of piezo-electric substance, a metal contact piece secured to said plate, a wire secured to said contact piece for making electrical and mechanical connection to said plate, and a metallic layer covering the exposed surfaces of the contact piece and the adjacent surface of the wire and the piezo-electric plate.

3. A piezo-electric crystal element comprising a piezo-electric crystal having at least two electrode surfaces, metallic contact pieces secured to said crystal at suitable points on said electrode surfaces, wires secured to said contact pieces for making electrical and mechanical connection thereto, and a metallic layer covering each of said electrode surfaces and the exposed surface of said contact piece secured thereto and of an adjacent portion of the wire secured to the contact piece, said crystal being supported by means of said wires.

4. A piezo-electric crystal element comprising a piezo-electric crystal plate having at least two electrode surfaces, metallic contact pieces, adhesive substance securing said contact pieces to said electrode surfaces, wires secured to said contact pieces for making electrical and mechanical connection thereto, and a metallic layer covering each of said electrode surfaces and the exposed surface of said contact piece secured thereto, said crystal plate being supported by means of said wires.

5. A piezo-electric element system comprising a piezo-electric crystal plate having at least two electrode surfaces, metallic contact pieces, adhesive substance securing said contact pieces to said electrode surfaces, wires secured to said contact pieces for making electrical and mechanical connection thereto, a thin metallic layer covering each of said electrode surfaces and the exposed surface of said contact piece secured thereto, and an evacuated vessel, said crystal plate being mounted in said vessel.

6. A piezo-electric crystal element according to claim 5, in which said connecting wires are disposed substantially perpendicular to said electrode surfaces and further metallic rods are secured to said wires at right angles and passed through and secured in said evacuated vessel so as to enable electrical contact to be made in an external circuit.

7. A piezo-electric element mounted for connection in a filtering circuit comprising a plurality of piezo-electric crystal plates each having at least two electrode surfaces, metallic contact pieces, adhesive substance securing said contact pieces to said electrode surfaces for making electrical connection thereto, a thin metallic layer covering each of said contact pieces secured thereto, an evacuated vessel, U-shaped rods mounted in said vessel, said crystal plates being mounted in said vessel with said connecting wires at right angles to the arms of said U-shaped rods and connected thereto, the wires connected to the electrode surface which are to be connected to the same point in the filtering circuit being connected to the same U-shaped rod, said U-shaped rods supporting said crystal plates, and supporting rods connected to said U-shaped members passed through and supported by a part of said envelope.

8. A piezo-electrical element comprising a plate of piezo-electric substance, a contact piece secured to said plate, a wire secured to said contact piece for making electrical and mechanical connection to said plate, and a conductive layer covering the exposed surfaces of the contact piece and the adjacent surface of the wire and the piezo-electric plate.

MARCEL CHARLES TOURNIER.

References Cited in the file of this patent

UNITED STATES PATENTS

| Number | Name | Date |
|---|---|---|
| 2,275,122 | Ziegler | Mar. 3, 1942 |
| 2,371,613 | Fair | Mar. 20, 1945 |
| 2,410,825 | Lane | Nov. 12, 1946 |
| 2,474,241 | Jarrison | June 28, 1949 |
| 2,502,970 | Manning | Apr. 4, 1950 |